(12) United States Patent
Fu et al.

(10) Patent No.: US 12,430,520 B2
(45) Date of Patent: Sep. 30, 2025

(54) METHOD FOR TESTING POS MACHINE, TEST TERMINAL AND NON-TRANSITORY COMPUTER READABLE STORAGE MEDIUM

(71) Applicant: SHENZHEN ZOLON TECHNOLOGY CO., LTD., Shenzhen (CN)

(72) Inventors: Jiansheng Fu, Guangdong (CN); Shaolin Wang, Guangdong (CN); Changshen Lin, Guangdong (CN); Songhe Wang, Guangdong (CN)

(73) Assignee: SHENZHEN ZOLON TECHNOLOGY CO., LTD., Shenzhen (CN)

( * ) Notice: Subject to any disclaimer, the term of this patent is extended or adjusted under 35 U.S.C. 154(b) by 198 days.

(21) Appl. No.: 18/267,961

(22) PCT Filed: Oct. 18, 2021

(86) PCT No.: PCT/CN2021/124466
§ 371 (c)(1),
(2) Date: Jun. 16, 2023

(87) PCT Pub. No.: WO2022/127338
PCT Pub. Date: Jun. 23, 2022

(65) Prior Publication Data
US 2024/0054067 A1    Feb. 15, 2024

(30) Foreign Application Priority Data
Dec. 18, 2020  (CN) .......................... 202011501569.8

(51) Int. Cl.
*G06K 7/00*  (2006.01)
*G06F 11/3668*  (2025.01)
(Continued)

(52) U.S. Cl.
CPC ........ *G06K 7/0095* (2013.01); *G06F 11/3668* (2013.01); *G06K 7/084* (2013.01); *G07G 1/12* (2013.01)

(58) Field of Classification Search
CPC .. G06K 7/0095; G06K 7/084; G06F 11/3668; G07G 1/12; G06Q 20/20
See application file for complete search history.

(56) References Cited

U.S. PATENT DOCUMENTS

2007/0138299 A1   6/2007  Mitra
2019/0156072 A1*  5/2019  Johnson ............... G06Q 20/204

FOREIGN PATENT DOCUMENTS

CN   101710438 A    5/2010
CN   203102433 U    7/2013
(Continued)

OTHER PUBLICATIONS

International Search Report dated Jan. 17, 2022; International Application No. PCT/CN2021/124466; 2 pages (English).
(Continued)

*Primary Examiner* — Matthew Mikels
(74) *Attorney, Agent, or Firm* — CANTOR COLBURN LLP (57) ABSTRACT

A method for testing a POS machine is applied to the test terminal and includes: obtaining sample data of a magnetic track; outputting a first test level according to the sample data of the magnetic track and generating a magnetic field that varies over time according to the first test level; and obtaining a first operation result generated by a POS machine under test and obtaining a test result of whether the POS machine under test can perform a card swiping operation normally according to the first operation result. The first operation result is an operation result which is generated by the POS machine under test according to an electromagnetic induction effect generated according to the magnetic field (Continued)

that varies over time. By performing the method, operational complexity of testing of the POS machine can be reduced, and the efficiency of testing of the POS machine can be improved.

13 Claims, 6 Drawing Sheets

(51) Int. Cl.
    *G06K 7/08*     (2006.01)
    *G07G 1/12*     (2006.01)

(56)     References Cited

FOREIGN PATENT DOCUMENTS

| | | |
|---|---|---|
| CN | 104502832 A | 4/2015 |
| CN | 105092986 A | 11/2015 |
| CN | 112540927 A | 3/2021 |

OTHER PUBLICATIONS

International Search Report dated Jan. 17, 2022; International Application No. PCT/CN2021/124466; 3 pages (non-English).
Written Opinion dated Jan. 17, 2022; International Application No. PCT/CN2021/124466; 4 pages (non-English).

* cited by examiner

METHOD FOR TESTING POS MACHINE, TEST TERMINAL AND NON-TRANSITORY COMPUTER READABLE STORAGE MEDIUM

CROSS-REFERENCE TO RELATED APPLICATIONS

This application is a 35 U.S.C. § 371 national stage application of PCT patent application No. PCT/CN2021/124466, filed on Oct. 18, 2021, which claims priority to Chinese patent application No. 202011501569.8, filed on Dec. 18, 2020, the entire contents each of which are incorporated herein by reference.

FIELD

The present application relates to the field of computer technologies, and more particularly, to a method for testing a POS machine, a test terminal and a non-transitory computer readable storage medium.

BACKGROUND

A point of sale (POS) is a multifunctional terminal used for automatic transfer of electronic funds. The main working principle of the POS machine is that when a magnetic stripe card moves in a slot of the POS machine, a magnetic head of the POS machine cuts magnetic field lines of the magnetic stripe card and generates induced electromotive force. The POS machine reads magnetic track data in the magnetic stripe card according to the electromagnetic induction force, and thereby completes the transaction according to information including a password and a transaction amount entered by a user.

When designing a POS machine or application software on the POS machine, a developer or a tester often needs to perform a card swiping operation on the POS machine to test whether a payment application can accurately complete a payment operation. However, the conventional testing methods for POS machine have high operational complexity, which results in a low efficiency in a testing process of the POS machine.

SUMMARY

Embodiments of the present application provide a method and an apparatus for testing a POS machine, a test terminal and a storage medium that can solve a technical problem that conventional methods for testing POS machine have low efficiency.

According to the first aspect of the embodiments of the present application, a method for testing a point of sale (POS) machine is provided. The method for testing the POS machine is applied to a test terminal and includes:
  obtaining a sample data of a magnetic track;
  outputting a first test level according to the sample data of the magnetic track, and generating a magnetic field that varies over time according to the first test level; and
  obtaining a first operation result generated by a POS machine under test and obtaining a test result of whether the POS machine under test can perform a card swiping operation normally according to the first operation result; the first operation result is an operation result which is generated by the POS machine under test according to an electromagnetic induction effect generated by the magnetic field that varies over time.

According to the second aspect of the embodiments of the present application, a test terminal is provided. This test terminal includes a memory, a processor and a computer program stored in the memory and executable by the processor. The processor is configured to, when executing the computer program, implement the steps of the aforesaid method for testing the POS machine.

According to the third aspect of the embodiments of the present application, a non-transitory computer-readable storage medium is provided. The non-transitory computer-readable storage medium store an instruction, that, when executed by a computer, causes the computer to perform the steps of the method for testing the POS machine.

According to the fourth aspect of the embodiments of the present application, a computer program product is provided. The computer program product stores a computer program, that, when executed by a test terminal, causes the test terminal to implement the steps of the method for testing the POS machine.

It can be understood that, regarding the beneficial effects in the second aspect, the third aspect, the fourth aspect, reference can be made to the relevant descriptions in the first aspect. The beneficial effects in the second aspect, the third aspect, and the fourth aspect are not repeatedly described herein.

In the embodiments of the present application, the sample data of the magnetic track is obtained, the first test level is output according to the sample data of the magnetic track, and the magnetic field that varies over time is generated according to the first test level. Then, the first operation result generated by the POS machine under test is obtained, and the test result of whether the POS machine under test can perform the card swiping operation normally is obtained according to the first operation result, a card swiping operation is simulated during testing of an application to be tested on the POS machine. Where, the first operation result is the operation result generated by the POS machine under test according to the electromagnetic induction effect, after the electromagnetic induction effect is generated by the magnetic field that varies over time. That is, according to the present application, the magnetic field that varies over time in the form of level signal is generated according to the sample data of the magnetic track, such that the magnetic head of the POS machine can be enabled to sense the electromagnetic induction effect and read the sample data of the magnetic track, the actual card swiping operation is replaced. Thus, according to the embodiments of the present application, the card swiping operation during a testing process of the POS machine can be avoided, and a preparation of a physical magnetic stripe card is unnecessary. A card replacement operation is also unnecessary when testing magnetic stripe cards issued by different bank card organizations, the operational complexity of testing of the POS machine is reduced and the efficiency of the testing of the POS machine is improved.

Moreover, the test terminal for performing the method provided in the present application does not need to be equipped with a mechanical structure for card swiping operation and card replacement operation, such as a robotic arm, maloperation caused due to the mechanical structure can be avoided, a testing success rate is improved, and the cost of testing is reduced.

DESCRIPTION OF THE DRAWINGS

In order to describe the embodiments of the present application more clearly, a brief introduction regarding the accompanying drawings that need to be used for describing the embodiments of the present application or the existing technologies is given below. It is obvious that the accompanying drawings described below are merely some embodiments of the present application, a person of ordinary skill in the art can also acquire other drawings according to the current drawings without paying creative efforts.

DETAILED DESCRIPTION OF EMBODIMENTS

In order to make the objective, the technical solutions and the beneficial effects of the present application be clearer and more understandable, the present application is further described in detail below with reference to the accompanying figures and the embodiments. It should be understood that the embodiments described herein are only intended to illustrate but not to limit the present application. According to the embodiments in the present invention, some other embodiments, which are obtained by the person of ordinary skill in the art without paying creative efforts, are all included in the protection scope of the present application.

A point of sale (POS) is a multifunctional terminal used for automatic transfer of electronic funds. The main working principle of the POS machine 10 is that when a magnetic stripe card moves in a card slot of the POS machine 10, a magnetic head of the POS machine 10 cuts magnetic field lines of the magnetic stripe card and generates an induced electromotive force. The POS machine 10 reads magnetic track data in the magnetic stripe card according to the electromagnetic induction effect, and then completes the transaction according to a password, a transaction amount, and other information entered by a user.

When designing the POS machine 10 or application software on the POS machine 10, developers or testers often need to perform a card swiping operation on the POS machine 10 to test whether a payment application can accurately complete a payment operation. However, the method for testing the POS machine 10 in the related art have high operational complexity, which results in a low efficiency in the testing process of the POS machine 10.

In order to illustrate the technical solutions of the present application, the technical solutions of the present application are described according to the specific embodiments below.

Figure 1:
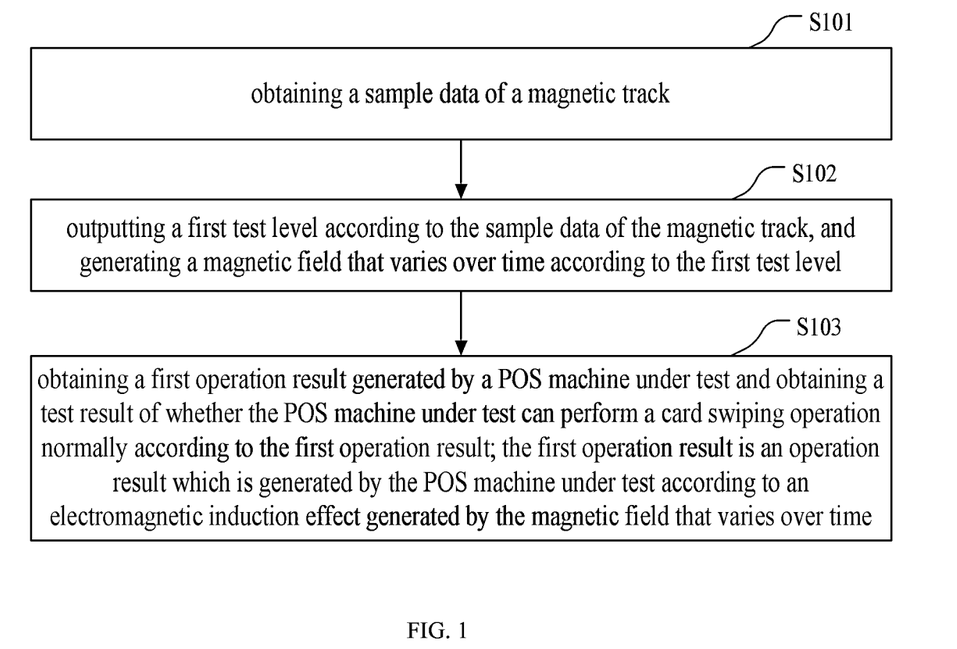
FIG. 1 illustrates a first schematic flow diagram of implementation of a method for testing POS machine in accordance with one embodiment of the present application.

FIG. 1 illustrates a flowchart of implementation of a method for testing a POS machine 10 provided in one embodiment of the present application. This method can be applied to a test terminal 9 and can also be applied to a situation in which the reliability of testing needs to be improved.

The test terminal 9 can be an ESPDuino development board or an Arduino controller and other terminals.

In some embodiments, the method for testing the POS machine 10 can include steps S101-S103.

In the Step of S101, sample data of a magnetic track is obtained.

The sample data of the magnetic track refers to the magnetic track data used for testing the POS machine 10.

In the traditional method for testing POS machine 10, preparation of a magnetic stripe card for a card swiping operation is required. The magnetic stripe card usually contains multiple magnetic tracks, and each magnetic track contains some data that represents magnetic stripe card information carried by the magnetic stripe card, such as a magnetic stripe card number, a service code, and a currency code.

In this embodiment of the present application, there is no need to rely on the physical magnetic stripe card. The test terminal 9 can test the POS machine 10 by obtaining the sample data of the magnetic track and simulating the card swiping operation using the sample data of the magnetic track.

The method for obtaining the sample data of the magnetic track can be selected according to the actual requirement. In some embodiments of the present application, the test terminal 9 can obtain a magnetic track sample set preset by a developer. The magnetic track sample set includes multiple sets of sample data of magnetic track sample data, and each set of magnetic track sample data includes data of multiple magnetic tracks carried in one single magnetic stripe card.

In other embodiments of the present application, since the magnetic stripe card information carried in the multiple magnetic tracks generally follow a specific magnetic track specifications in the magnetic stripe card. Thus, the test terminal 9 can also obtain the magnetic stripe card information and the magnetic track specifications for testing, and generate the sample data of the multiple magnetic tracks according to the magnetic stripe card information and the magnetic track specifications.

In some embodiments, the magnetic track specifications for domestic UnionPay cards are as follows:

Track 1: "%" (start flag)+"99" (format code)+"16 digit card number" (primary account number)+"^" (field separator)+"NM" (name)+"^"+"expiry_date YYMM" (expiration date)+"101 or 501 (PRMCD. SERV-CODE)" (service code)+"CARD. PVV" (additional data)+"0000000000" (additional data)+"CVV" (card verification code)+"00" (additional data)+"?" (end flag).

Track 2: ";" (start flag)+"16 digit card number" (primary account number)+"=" (field separator)+"expiry_date YYMM" (expiration date)+"106" (service code)+"PVV" (additional data)+"00" (additional data)+"CVV" (card verification code)+"?" (end flag).

Track 3: ";" (start flag)+"99" (format code)+"16 digit card number" (primary account number)+"=" (field separator)+"156" (country code)+"156" (currency code)+"000000000" (amount index+cycle authorization amount+current cycle balance)+"000000" (cycle start date+cycle length)+"30000000" (number of password reenters+individual authorization control parameters+exchange control characters)+"000000" (TA and SR of PAN+TA and SR of SAN-1 and TA and SR of SR+SAN-2)+"expiry_date YYMM" (validity period)+"0" (card serial number)+"=" (card secret number)+"000000000000" (SAN-1)+"=" (field separator)+"000000000000" (SAN-2)+"=" (field separator)+"1" (transfer flag)+"000000" (encrypted checksum)+"00000000" (additional data)+"?" (end flag).

Magnetic track specifications for international cards (MasterCard, VISA) are as follows:

Track 1: "%" (start flag)+"B" (format code)+"16 digit card number" (primary account number)+"^" (field separator)+"NM" (name)+"^"+"YYMM (4N)" (expiration date)+"101" (service code)+"PVV" (additional data)+"00" (additional data)+"CVV" (card verification code)+"000000" (additional data)+" (end flag).

Track 2: ";" (start flag)+"16 digit card number" (primary account number)+"=" (field separator)+"YYMM" (validity period)+"101" (service code)+"PVV" (additional data)+"CVV" (card verification code)+"XXX" (bank reserved number)+"?" (end flag).

Track 3: ";" (start flag)+"99" (format code)+"16 digit card number" (primary account number)+"=" (field separator)+"156" (country code)+"156" (currency code)+"0" (amount index)+"0000" (cycle authorization amount)+"0000" (current cycle balance)+"0000" (cycle start date)+"00" (cycle length)+"0" (number of password reenters)+"000000" (personal authorization control parameter)+"0" (exchange control character)+"34" (TA and SR of PAN)+"34" (TA and SR of SAN-1)+"34" (TA and SR of SAN-2)+"YYMM" (validity period)+"0" (card serial number)+"=" (card security number)+"000000" (SAN-1)+"=" (field separator)+"000000" (SAN-2)+"=" (field separator)+"0" (transfer flag)+"000000" (encrypted checksum)+"PVV" (additional data)+"CVV" (Card Verification Code)+"XXX" (Bank Reserved Number)+"?" (end Flag).

Thus, in some embodiments of the present application, the test terminal 9 can generate sample data of magnetic track for each magnetic track according to the obtained primary account number, the country code, the currency code and other magnetic stripe card information, according to the magnetic track specifications.

In some embodiments of the present application, longitudinal redundancy check (Longitudinal Redundancy Check, LRC) codes can be added to obtain new magnetic track sample data, after the magnetic track sample data of the magnetic tracks. The redundancy check code is used for security verification.

In some embodiments, the data of magnetic track 1 is taken as an example. The test terminal 9 can obtain ASCII codes corresponding to the characters in the data of the magnetic track 1, and subtract a hexadecimal number "0x20" from the ASCII codes corresponding to the characters to obtain new magnetic track data. Then, an XOR operation is performed on a first digit of the new track data and the hexadecimal number "0x00" to obtain a longitudinal redundancy value. Then, an XOR operation is performed on the longitudinal redundancy value and the second bit in the new track data to obtain the new longitudinal redundancy value. The operations are repeatedly performed until the XOR operation is performed on the last bit of the new track data to obtain the final longitudinal redundancy value. A hexadecimal number "0x20" is added to the final longitudinal redundancy value to obtain the aforesaid longitudinal redundancy check code. Then, the longitudinal redundancy check code is added at the end of the data of the magnetic track 1 to obtain the final sample data of the magnetic track 1 for testing.

The aforesaid technical solutions are illustrated by taking the magnetic track 1 as an example. Regarding the implementation methods of a magnetic track 2 and a magnetic track 3, reference can be made to the implementation method of the magnetic track 1, the implementation methods of the magnetic track 2 and the magnetic track 3 will not be repeatedly described in the present application.

In some embodiments of the present application, the method for obtaining the magnetic stripe card information mentioned above can also be adjusted according to the actual situation.

In some embodiments of the present application, the test terminal can establish a communication connection with a remote terminal and receive a test instruction sent by the remote terminal. The test instruction can carry the magnetic stripe card information. The test terminal 9 can analyze the test instruction and obtain the magnetic stripe card information carried in the test instruction after receiving the test instruction sent by the remote terminal.

In one embodiment, the remote terminal can be a computer, a Raspberry Pi (RPi), or be other terminal. The remote terminal can establish communication connection with the test terminal 9 by using universal serial bus (USB) or other methods, and send the test instruction to the test terminal 9. In this condition, the tester can test the POS machine 10 remotely. That is, the tester completes the subsequent testing of the POS machine 10 by controlling a principal computer.

In a step of S102, a first test level is output according to the sample data of the magnetic track and a magnetic field that varies over time is generated according to the first test level.

Specifically, in this embodiment of the present application, the test terminal 9 can generate the first test level according to the characters in the sample data of the magnetic track. Different levels will be generated in the first test level according to the characters in the sample data.

According to the magnetic effect of the current, a variable current will generate a magnetic field that varies over time after the test terminal 9 outputs the first test level. In the magnetic field generated by the current, the strength of the magnetic field is related to the magnitude of the current. Under certain condition, the greater the current is, the greater the strength of the magnetic field of the current is.

In a step of S103, the first operation result generated by the POS machine 10 under test is obtained, and a test result of whether the POS machine 10 under test can perform a card swiping operation normally is obtained according to the first operation result.

The aforesaid tested POS machine 10 refers to the POS machine 10 that needs to be tested. The aforesaid first operation result is the operation result generated by the POS machine 10 under test according to the electromagnetic induction effect generated by the magnetic field that varies over time.

Under certain conditions, changes in magnetic field intensity can cause changes in magnetic flux. According to the law of electromagnetic induction, changes in magnetic flux can generate induced electromotive force in a closed circuit.

Thus, in the embodiments of the present application, the test terminal 9 generates the magnetic field that varies over time by outputting the first test level, and the magnetic head of the POS machine under test located within the magnetic field that varies over time can detect the electromagnetic induction effect, such that the POS machine 10 under test can read the sample data of the magnetic track and complete a simulated card swiping operation. The tested POS will generate the first operation result after completing the simulated card swiping operation.

The aforesaid first operation result refers to response information generated by the POS machine 10 under test after simulating the card swiping operation. The aforesaid first operation result can indicate that the POS machine 10 under test can perform the card swiping operation normally, or indicate that the POS machine 10 under test cannot perform the card swiping operation normally.

The method for obtaining the first operation result can be selected according to the actual situation. In some embodiments of the present application, the test terminal 9 can obtain the first operation result fed back by the POS machine 10 under test proactively. As an alternative, the test terminal 9 can also obtain the first operation result of the POS machine 10 under test proactively.

In some embodiments, since the POS machine 10 under test is generally designed to display the first operation result in the form of voice or character to prompt the user of the POS machine 10 under test, thus, the test terminal 9 can obtain the first operation result in voice recognition or character recognition manner.

In this embodiment of the present application, after the first operation result is generated by the POS machine 10 under test, the test terminal 9 can obtain the first operation result of the POS machine 10 under test and determine the test result of the POS machine 10 under test according to the first operation result.

The aforesaid first test result refers to the test result of the POS machine 10 under test or application software on the POS machine 10 under test. The first test result can contain certain data or identifiers for indicating whether the POS machine 10 under test can perform the card swiping operation normally.

Performing of the aforesaid card swiping operation normally can refer to whether the card swiping operation can be completed by the POS machine 10 normally, or refer to the test result of whether the card swiping operation and the subsequent functions can be completed by the POS machine 10.

For example, in some embodiments of the present application, if the purpose of testing the POS machine 10 under test is to detect whether the POS machine 10 under test can complete the card swiping operation normally, the test terminal 9 can use the first operation result as the test result.

For example, in some other embodiments of the present application, if the purpose of testing the POS machine 10 under test is to detect whether the POS machine 10 can complete a payment operation normally, the test terminal 9 can further input the test password into the POS machine 10 according to the first operation result. Then, the POS machine 10 can perform the payment function according to the sample data of the magnetic track and the test password, and feedback a payment result. The test terminal 9 can obtain a test result of whether the POS machine 10 under test can perform payment normally according to the payment result.

In this embodiment of the present application, the sample data of the magnetic track is obtained, the first test level is output according to the sample data of the magnetic track, and the magnetic field that varies over time is generated according to the first test level. Then, the first operation result generated by the POS machine 10 under test is obtained, and the test result of whether the POS machine 10 under test can perform the card swiping operation normally is obtained. The card swiping operation performed when testing an application of the POS machine 10 under test is simulated. The first operation result is the operation result generated by the POS machine 10 under test according to the electromagnetic induction effect which is generated by the magnetic field that varies over time. In brief, according to the present application, the magnetic field that varies over time is generated in the form of level signal according to the sample data of the magnetic track, such that the magnetic head of the POS machine 10 is enabled to sense the electromagnetic induction effect and read the sample data of the magnetic track, the actual card swiping operation is replaced. Thus, according to this embodiment of the present application, a card swiping operation during testing of the POS machine 10 is avoided, the preparation of the physical magnetic stripe card is unnecessary. When testing magnetic stripe cards issued by different bank card organizations, there is no need to perform a card replacement operation, either. The operational complexity of testing of the POS machine 10 is reduced and the efficiency of the testing process of the POS machine 10 is improved.

Moreover, the test terminal 9 used for performing the method provided in the present application does not need to be equipped with a mechanical structure such as a robotic arm for card swiping operation and card replacement operation, maloperation caused by the mechanical structure is avoided, the success rate of testing of the POS machine 10 is improved, and the cost on testing of the POS machine 10 is reduced.

In order to enable the magnetic head of the POS machine 10 under test to sense the electromagnetic induction effect, in some embodiments of the present application, the test terminal 9 can be equipped with one or a plurality of output port(s) connected to the magnetic induction coil. Each first level output port 93 can be an input/output (Input/Output, I/O) port.

Figure 2:
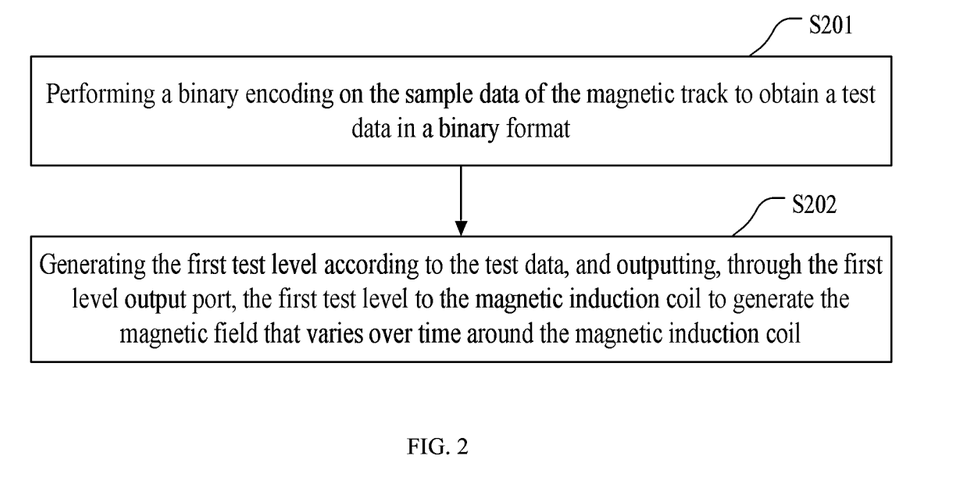
FIG. 2 illustrates a schematic flow diagram of concrete implementation of a step S102 in accordance with one embodiment of the present application.

In this condition, as shown in FIG. 2, said outputting the first test level according to the sample data of the magnetic track, and generating the magnetic field that varies over time according to the first test level can include following steps S201-S202:

In the step of S201, a binary encoding is performed on the sample data of the magnetic track to obtain a test data in a binary format.

The binary encoding method can be selected according to the actual situation.

In some embodiments of the present application, the test terminal 9 can convert each character in the data of magnetic track 1 in the sample data of the magnetic track into a 7-bit binary format after obtaining the sample data of the magnetic track. Then, each character in the magnetic track 2 or the magnetic track 3 of the sample data of the magnetic track is converted into a 5-bit binary format. Finally, test data in binary format corresponding to the magnetic tracks of the sample data of the magnetic track is obtained. Based on the illustrations described above, it can be understood that a string composed of specific digits can represent a character in one certain magnetic track in the test data.

It should be noted that, other binary encoding methods can also be applied to the method of the present application.

In the step of S202, a first test level is generated according to the test data, the first test level is output to the magnetic induction coil through the first level output port 93, and the magnetic field that varies over time is generated around the magnetic induction coil.

In some embodiments of the present application, the binary data contains two binary characters of 0 and 1. According to the various binary characters in the test data in the binary format, the first test level can be generated. Each binary character in the test data can generate a predetermined period of level in the first test level, and the specific level signal value of this period of level is related to the value of the binary characters in the test data.

In some embodiments of the present application, if the binary character is "1", a first test level containing two different levels within a preset period of time can be generated. If the binary character is "0", a first test level containing two identical levels within a preset period of time can be generated.

For example, when the binary character is 1, a first test level containing one high level and one low level within 300 ms can be generated. If the binary character is 0, a first test level containing two high levels within 300 ms can be generated, or a first test level containing two low levels within 300 ms can be generated.

By using the aforesaid method, multiple segments of levels can be generated for the binary characters in the test data in the format of binary strings. The first test level can be obtained by connecting the segments of levels in the order of binary characters.

It should be noted that, the above descriptions are examples of implementation method for generating levels. In practical application, other methods for generating levels can also be applied to the present application. For example, the implementation method for generating levels can also be implemented as follows: if the binary character is 1, a first test level containing two identical levels within a preset period of time is generated; if the binary character is 0, a first test level containing two different levels within a preset period of time is generated. The implementation method for generating levels is not excessively limited by the present application.

In this embodiment of the present application, the levels corresponding to the two aforesaid binary characters are different. When the first test level is output to the magnetic induction coil through the first level output port 93, the current in the magnetic induction coil are variable with the variation of levels. The variable current will cause a change in magnetic induction intensity of the magnetic field around the magnetic induction coil, and the change in the magnetic induction intensity further causes a change in the magnetic flux in the magnetic field, and a magnetic field that varies over time is further generated around the magnetic induction coil accordingly.

According to the embodiments of the present application, the binary encoding operation is performed on the sample data of the magnetic track. Then, the first test level is generated according to the test data, such that the sample data of the magnetic track can be output in the form of variable levels, and variable current is generated in the magnetic induction coil connected to the first level output of the test terminal 9. Lastly, the magnetic field that varies over time is generated around the magnetic induction coil. The magnetic head of the POS machine 10 under test senses the electromagnetic induction effect, thereby achieving a simulated card swiping effect.

Figure 3:
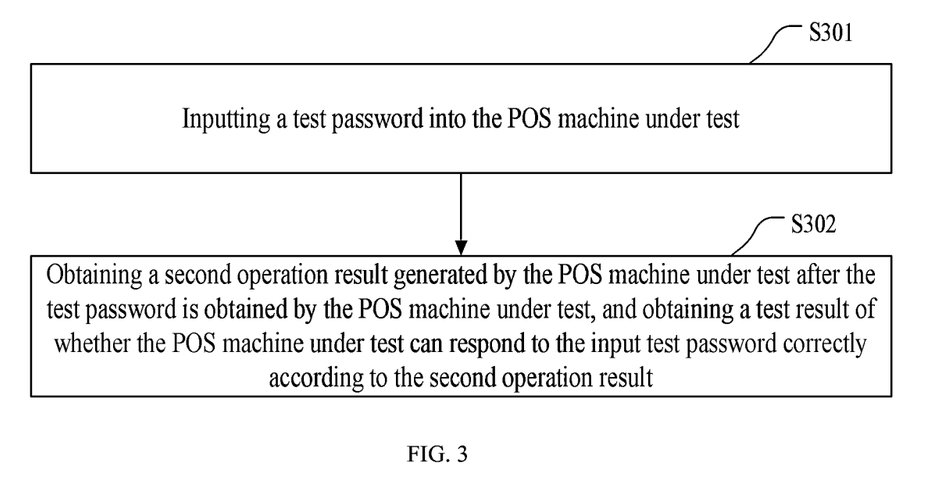
FIG. 3 illustrates a second schematic flow diagram of implementation of the method for testing POS machine in accordance with one embodiment of the present application.

In practical application, when the POS machine 10 under test needs to complete the functions such as querying and payment, the POS machine 10 also needs to obtain a password. Thus, in order to test the functionality of the POS machine 10 under test, in some embodiments of the present application, as shown in FIG. 3, after obtaining the test result indicating that the POS machine 10 under test can perform the card swiping operation normally, the method can further include the following steps S301-S302.

In the step of S301, the test password is input into the POS machine 10 under test.

The test password refers to the password related to the primary account number of the magnetic stripe card carried in the sample data of the magnetic track, and is used for testing the POS machine 10 under test. The test password can be the same as the correct password corresponding to the primary account number of the magnetic stripe card, or be different from the correct password corresponding to the primary account number of the magnetic stripe card. Thus, a comprehensive test of the functions of the POS machine 10 is completed.

In the step S302, the second operation result generated by the POS machine 10 under test after obtaining the test password is obtained, and a test result of whether the POS machine 10 under test can correctly respond to password input is obtained according to the second operation result.

In some embodiments of the present application, after inputting the test password to the POS machine 10 under test, the POS machine 10 under test may perform some functional operations responding to the password input, such as querying and paying, according to the magnetic track data analyzed from the electromagnetic induction effect and the test password. By performing the functional operations, the tested POS will generate the second operation result. The second operation result can be that payment is failed or payment is successful.

Taking the test of payment function as an example. If the test password is the same as the correct password corresponding to the primary account number of the magnetic stripe card, and the second operation result is that payment is failed, or if the test password is different from the correct password corresponding to the primary account number of the magnetic stripe card, and the second operation result is that payment is successful, the test result obtained according to the second operation result should be a failed test. If the test password is the same as the correct password corresponding to the primary account number of the magnetic stripe card and the second operation result is that payment is successful, or if the test password is different from the correct password corresponding to the primary account number of the magnetic stripe card, and the second operation result is that payment is failed, the test result obtained according to the second operation result should be a successful test.

In the embodiments of the present application, the second operation result which is generated by the POS machine 10 under test after obtaining the test password is obtained, and the test result of whether the POS machine 10 under test can correctly respond to password input is obtained according to the second operation result. Testing of the functions of the POS machine 10 under test such as payment and inquiry, which are implemented based on password input, can be implemented based on simulation of card swiping operation.

In one embodiment, the step S301 can also be implemented in the form of level.

In particular, in some embodiments of the present application, the test terminal 9 is provided with a relay 94, and a second level output port 95 and a conductive plate 96 connected to the relay 94. The second level output port 95 can be an input/output (I/O) port. In some embodiments of the present application, the relay 94 and the conductive plate 96 can form a click head.

Figure 4:
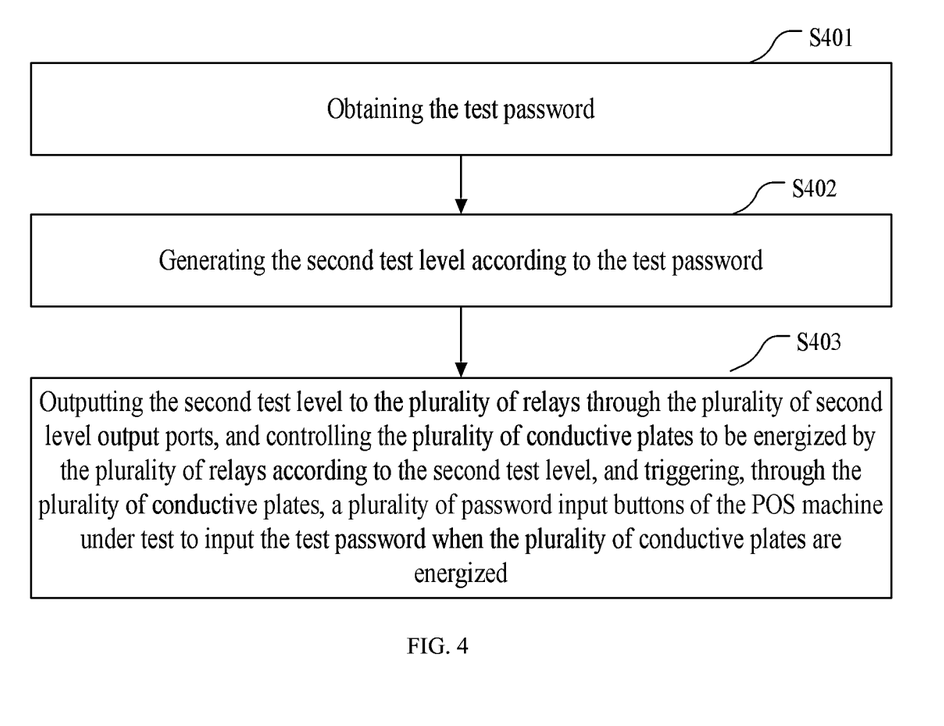
FIG. 4 illustrates a first schematic flow diagram of implementation of inputting test password in accordance with one embodiment of the present application.

In this case, as shown in FIG. 4, the step S301 can include steps S401-S403.

In the step of S401, the test password is obtained.

The method of acquisition of the test password can be referred to the method for obtaining the sample data of the magnetic track, and is not repeatedly described herein.

In the step of S402, the second test level is generated according to the test password.

In some embodiments, the second test level is used by the relay 94 for performing logic judgment. The number of second test levels can be plural. In this case, each second test level corresponds to one character in the test password. The number of the second test level can be one, and the second test level contains multiple level segments, each level segment corresponds to one character in the test password.

It should be noted that, when the second test level is a level composed of multiple level segments, the levels corresponding to different characters should be different, in order to distinguish different values in the test password. For example, character "0" corresponds to a level, character "1" corresponds to a level being different from the level corresponding to the character "0", character "2" corresponds to a level being different from the level corresponding to the character "0" and the level corresponding to the character "1", and so on.

When the second test level contains multiple level segments, the levels corresponding to different characters can be the same or different. When the levels corresponding to different characters are the same level, different values in the test password can be distinguished by adding identifiers or using other methods.

In the step of S403, the second test level is output to the relay 94 through the second level output port 95. The relay 94 controls the conductive plate 96 to be energized according to the second test level. When the conductive plate 96 is energized, the password input button of the POS machine 10 under test is triggered to input the test password.

In some embodiments of the present application, the aforesaid test terminal 9 outputs the second test level to the relay on the test terminal 9 through the second level output port 95. The relay 94 can make logical judgment according to the second test level and control the conductive plate to be energized at a specific level. When the conductive plate 96 is energized, the password input button of the POS machine 10 under test can be triggered to input the test password.

The aforesaid password input button can either be a physical button or be a virtual key. When the password button is a physical button, the conductive plate 96 can press the password input button of the POS machine 10 under test when being energized. When the password input button is a virtual key, the conductive plate 96 can click on the password input button of the POS machine 10 under test when being energized.

In some embodiments, when the second test level is a level composed of multiple level segments, the test terminal 9 can determine a character according to each level segment of the second test level, and control the conductive plate 96 corresponding to the character to be energized so as to trigger the password input button corresponding to the character on the POS machine 10 under test. When the second test level contains multiple level segments, the test terminal 9 can determine the character corresponding to each level segment and control the conductive plate 96 corresponding to the character to be energized so as to trigger the password input button corresponding to the character on the POS machine 10 under test.

Moreover, when the second test level generates a specific variation, the relay 94 will control the conductive plate 96 connected to the relay 94 to be de-energized, thereby achieving a releasing operation of the password input button of the POS machine 10 under test after triggering the password input button.

For example, when the second test level is a high level, the relay 94 will control the conductive plate 96 connected to the relay 94 to be energized. When the second test level is a low level, the relay 94 will control the conductive plate 96 connected to the relay 94 to be de-energized. Triggering and releasing of the password input button of the POS machine 10 under test can be implemented through high and low levels.

In this embodiment of the present application, the second test level is generated according to the test password, and the second test level is output to the relay 94 through the second level output port 95. The relay 94 controls the conductive plate 96 to be energized according to the second test level. When the conductive plate 96 is energized, the password input button of the POS machine 10 under test is triggered, and the test password is input. Thus, the password input operation is performed without human intervention. Moreover, after simulating the card swiping operation, input operation of the test password is automatically performed to complete testing of the functions such as payment and inquiry.

In some embodiments of the present application, the number of the second level output ports 95 may be plural. Moreover, each second level output port 95 is connected with one relay 94, and each relay 94 is connected with one conductive plate 96. The password input buttons of the POS machine 10 under test are plural, and the plurality of second level output ports 95 correspond to the plurality of password input buttons of the POS machine 10 under test in a one-to-one correspondence manner.

That is, one password input button corresponds to one second level output port 95, and different password input buttons correspond to different second level output ports 95. Different second level output ports 95 can be connected to different relays 94. The relays 94 are connected to different conductive plates 96.

Figure 5:
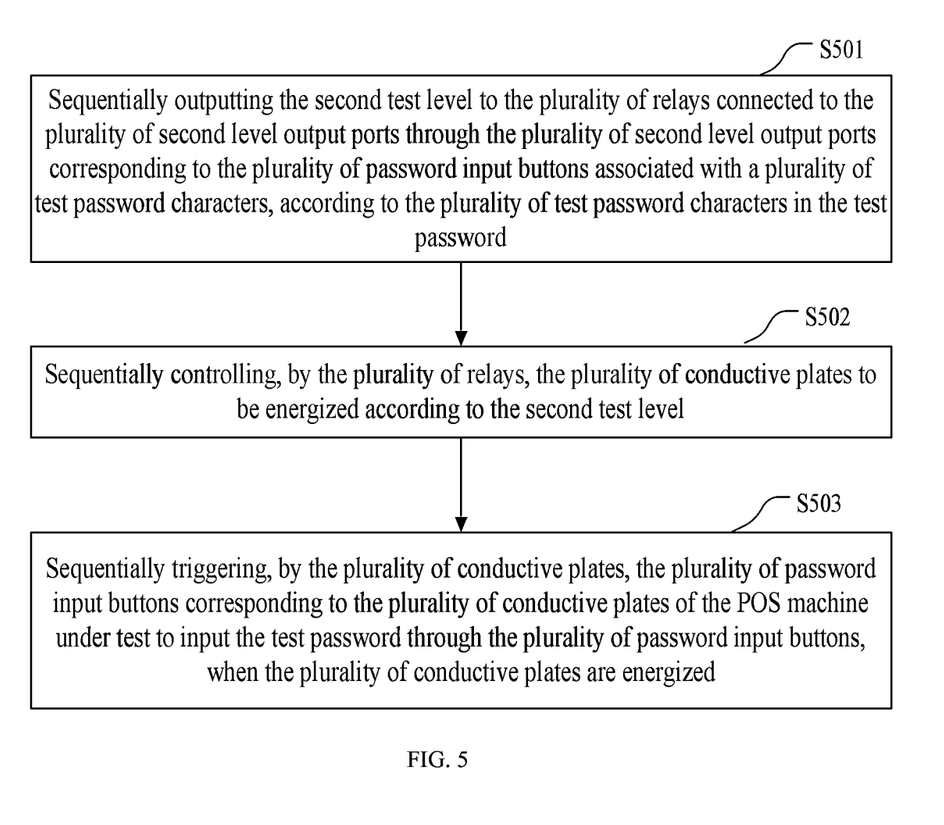
FIG. 5 illustrates a schematic flow diagram of concrete implementation of a step S402 in accordance with one embodiment of the present application.

In this case, as shown in FIG. 5, the step S403 can include steps S501-S503.

In the step of S501, the second test level is sequentially output to the relays 94 connected to the second level output ports 95 through the second level output ports 95 corresponding to the password input buttons associated with the test password characters, according to the test password characters in the test password.

In the step of S502, the relays 94 sequentially control the conductive plates 96 to be energized according to the second test level.

In the step of S503, when the conductive plates 96 are energized, the password input buttons corresponding to the conductive plates 96 of the POS machine 10 under test are triggered in sequence to input the test password.

Regarding the password input operation corresponding to one single second level output port 95, reference can be made to the description of the step S403, and this application will not elaborate on this.

That is, with regard to the first character in the test password, the second test level corresponding to the first character can be output to the relay connected to the second level output port 95 corresponding to the first character through the second level output port 95 corresponding to the first character. In this case, the relay 94 which receives the second test level corresponding to the first character will control the conductive plate connected to the relay 94 to be energized. The energized conductive plate 96 will trigger the corresponding password input button. Moreover, when the second test level corresponding to the first character generates a specific variation, the relay 94 will control the conductive plate 96 connected to it to be de-energized, thereby achieving a releasing operation of the password input button corresponding to the first character of the POS machine 10 under test after triggering. Next, the test terminal 9 will input the second character in the test password in the same way until all characters of the test password are entered.

For the convenience of interpretation, the test password is "000111" is taken as an example. 6 level segments of the second test level can be generated according to the test password, and the 6 level segments are all high level of 100 ms and low level of 100 ms. According to the order of the test password, a second level output port 95 corresponding to the first character "0" in the test password "000111" will output the first level segment of the second test level. The test terminal 9 will trigger the "0" key on the POS machine 10 under test according to the relay 94 connected to the second level output port 95 that corresponds to the character "0" and the conductive plate 96 connected to the relay. When the second test level is the low level, the relay 94 controls the conductive plate 96 to be de-energized to release a button "0" on the POS machine 10 under test. After performing the aforesaid operations by three times, an input of a string "000" in the test password can be completed. Next, a second level output port 95 corresponding to the first character "1" in the test password "000111" will output the first level segment of the second test level. The relay 94 connected to the second level output port 95 that corresponds to the character "1" and the conductive plate 96 connected to the relay 94 will trigger a button "1" on the POS machine 10 under test. When the second test level is a low level, the relay 94 controls the conductive plate 96 to be de-energized to release the button "1" on the POS machine 10 under test. After performing the aforesaid operations by three times, an input of the test password "000111" can be completed, and the input of the test password is completed accordingly.

In this embodiment of the present application, since the plurality of second level output ports 95 control the input of the plurality of password input buttons respectively, the test terminal 9 can complete triggering operation of one single password input button by only outputting the second test level to the relay 94 connected to the second level output port 95 through the second level output port 95 corresponding to the password input button. In this condition, the operation logic of the test terminal 9 is relatively simple, and the relay 94 does not need to perform complex level judgment, and complex circuit connections between the relays 94 and the conductive plates 96 are also unnecessary, the testing efficiency of the POS machine 10 can be effectively improved.

Figure 6:
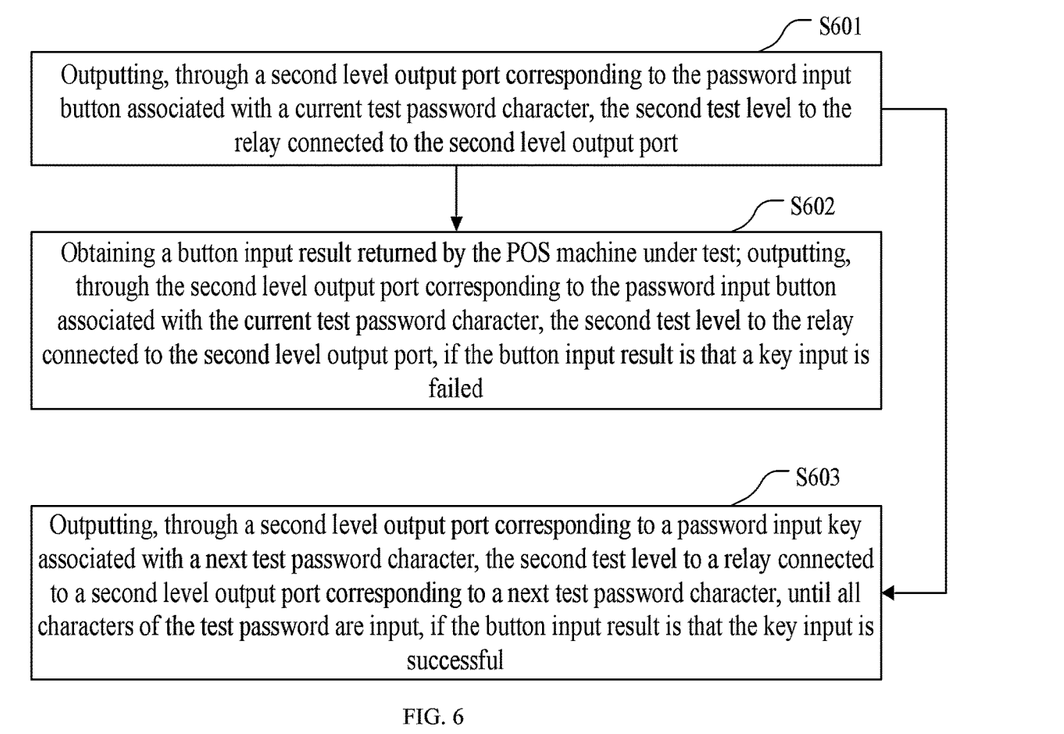
FIG. 6 illustrates a schematic flow diagram of concrete implementation of a step S501 in accordance with one embodiment of the present application.

In order to improve the success rate of password input, as shown in FIG. 6, the step S501 can include following steps S601-S603.

In the step of S601, the second test level is output to the relay 94 connected to the level output port through the second level output port 95 that corresponds to the password input button associated with the current test password character.

In the step of S602, a button input result returned by the POS machine 10 under test is obtained. If the button input result is that the button input is failed. Then, a second test level is input to the relay 94 connected to the level output port through the second level output port 95 that corresponds to the password input button associated with the current test password character.

The button input result refers to response information generated by the POS machine 10 under test after one single password input button is trigged. The method of acquisition of the operation result can be selected according to the actual situation. In some embodiments of the present application, the test terminal 9 can obtain button input result fed back by the POS machine 10 under test proactively. The button input result of the POS machine 10 under test can also be proactively obtained. In some embodiments, since the POS machine 10 under test is generally designed to display a button input result in the form of voice or character to prompt the user of the POS machine 10 under test. Thus, the test terminal 9 can obtain the button input result through voice recognition or character recognition.

In the step of S603, if the button input result is that the button input is successful, the second test level is output to the relay 94 connected to the second level output port 95 corresponding to the next test password character through the second level output port 95 that corresponds to the password input button associated with the next test password character, until inputting of all characters of the test password is completed.

That is, in this embodiment of the present application, when one single password input button is successfully input, the button input result fed back by the POS machine 10 under test is that the button input is successful. In this case, the next password input button can be triggered, and the input of all characters of the test password is ultimately realized. When input of one single password input button is failed, the button input result fed back by the POS machine 10 under test is that the button input is failed. In this case, the test terminal 9 can trigger the password input button again and detect the button input result fed back by the POS machine 10 under test again to improve the success rate of password input, and thereby improving the reliability of testing of the POS machine 10.

In practical application, the user's card swiping direction is uncertain. Thus, in some embodiments of the present application, it is also necessary to simulate the card swiping direction.

Figure 7:
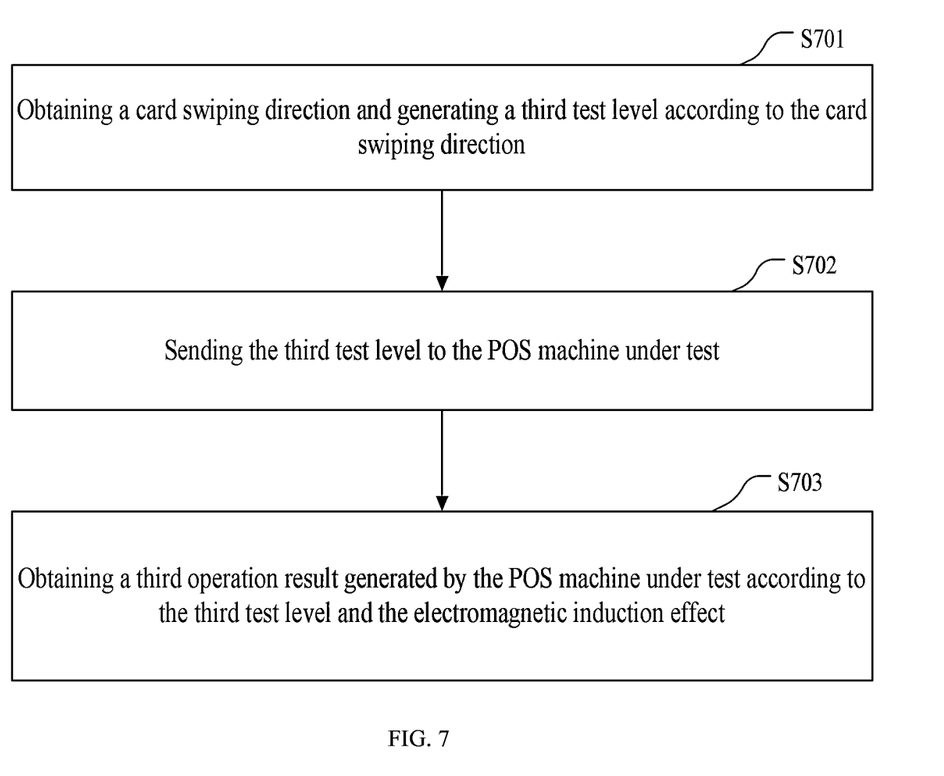
FIG. 7 illustrates a schematic flow diagram of concrete implementation of a step S103 in accordance with one embodiment of the present application.

In some embodiments, as shown in FIG. 7, in some embodiments of the present application, the method for testing the POS machine 10 may also include steps S701-S703.

Step S701, a card swiping direction is obtained and a third test level is generated according to the card swiping direction.

The method of acquisition of the card swiping direction can be referred to the method for obtaining the sample data of the magnetic track, and is not repeatedly described herein.

In some embodiments of the present application, different third test levels can be generated according to different card swiping directions. The values of the different third test levels can be adjusted according to the actual situation.

For example, when the card swiping direction is in the same direction as the preset standard card swiping direction, the third test level can be high level. When the card swiping direction is opposite to the preset standard card swiping direction, the third test level can be low level.

In the step of S702, the third test level is sent to the POS machine under test.

In some embodiments, the aforesaid test terminal 9 can also be provided with a third level output port which can output a third test level to the POS machine 10 under test.

When receiving the third test level, the POS machine 10 under test can simulate a card swiping operation in the card swiping direction corresponding to the third test level.

In the step of S703, a third operation result generated by the POS machine 10 under test is obtained according to the third test level and the electromagnetic induction effect.

The method of acquisition of the third operation result can be referred to the method of acquisition of the operation result in the step S103.

In this embodiment of the present application, the card swiping operation is simulated according to the first test level, and the card swiping direction is simulated according to the third test level, such that the impact of different card swiping directions on the POS machine 10 under test can be determined according to the third operation result generated by the POS machine 10 under test according to the third test level and the electromagnetic induction effect, the testing of card swiping operations of the POS machine 10 under test in different card swiping directions is realized.

It should be noted that, in order to enhance the reliability of testing of the POS machine 10, the data exchanged between different terminals in the steps can be in a preset format. For example, instruction data sent from a remote terminal to the test terminal 9, and the feedback data from the POS machine 10 can be the preset format.

In some embodiments of the present application, the preset format mentioned above can be:

Start sequence [1 byte]+Response command word [1 byte]+Data length [2 bytes]+Data [65535 bytes in maximum]+End sequence [1 byte]+Check value [1 byte]

The two bytes are in the order of high byte before low byte, that is, a big endian sorting method is adopted. In some embodiments of the present application, a method for calculating the check code can be selected according to the actual situation. For example, a longitudinal redundancy check (LRC) check code is used, which means that, the check value is XOR of all bytes from the start sequence to the end sequence, and the initial check value is 0x00.

An example of one format is only described above. In practical application, the preset format can be other format. Different terminals can determine the source of data mutually by using the preset format, improvement of the reliability of data transmission is facilitated.

It should be noted that, for the various method embodiments, for the conciseness of illustration, these method embodiments are expressed as the combination of a sequence of actions. However, those skilled in the art should understand that the present application is not limited to the described sequence of actions, this is because that some steps can also be performed in other sequences according to the present application.

Figure 8:
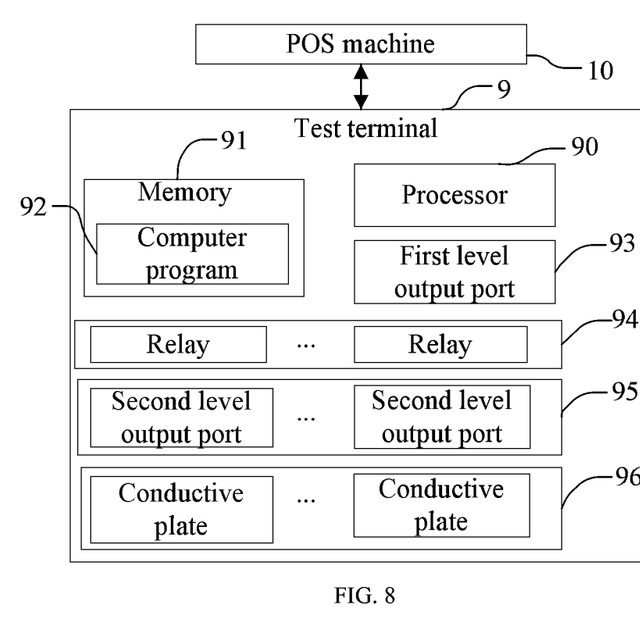
FIG. 8 illustrates a schematic structural block diagram of a test terminal in accordance with one embodiment of the present application.

As shown in FIG. 8, FIG. 8 illustrates a schematic diagram of a test terminal in accordance with one embodiment of the present application. The test terminal 9 can include: a processor 90, a memory 91, and a computer program 92 stored in the memory 91 and executable by the processor 90, such as the test procedure. The processor 90 is configured to, when executing the computer program 92, implement steps of the various method embodiments of the method for testing the POS machine 10.

The test terminal 9 can include but is not limited to: the processor 90 and the memory 91. The person of ordinary skill in the art can understand that, FIG. 8 is merely an example of the test terminal 9, and is not constituted as limitation to the test terminal 9. More or less components than the components shown in FIG. 8 may be included, or some components or different components may be combined. For example, the test terminal 9 can also include an input and output device, a network access device, a bus, etc.

The so-called processor 90 may be central processing unit (CPU), and can also be other general purpose processor, digital signal processor (DSP), application specific integrated circuit (ASIC), field-programmable gate array (FPGA), or some other programmable logic devices, discrete gate or transistor logic device, discrete hardware component, etc. The general purpose processor may be a microprocessor, as an alternative, the processor can also be any conventional processor, or the like.

The memory 91 may be an internal storage unit of the test terminal 9, such as a hard disk or a memory of the test terminal 9. The memory 91 may also be an external storage device of the test terminal 9, such as a plug-in hard disk, a SMC (Smart Media Card), a SD (Secure Digital) card, a FC (Flash Card) equipped on the test terminal 9. Furthermore, the memory 91 may not only include the internal storage unit of the test terminal 9 but also include the external memory of the test terminal 9. The memory 91 is configured to store the computer program, and other procedures and data needed by the test terminal 9. The memory 91 can also be configured to store data that has been output or being ready to be output temporarily.

In the aforesaid embodiments, the descriptions of the various embodiments are emphasized respectively, regarding a part of one embodiment which has not been described or disclosed in detail, reference can be made to relevant descriptions in other embodiments.

The foregoing embodiments are only intended to explain the technical solutions of the present application, rather than limiting the technical solutions of the present application. Although the present application has been described in detail with reference to these embodiments, a person of ordinary skilled in the art should understand that, the technical solutions disclosed in the embodiments may also be amended, some technical features in the technical solutions may also be equivalently replaced. The amendments or the equivalent replacements don't cause the essence of the corresponding technical solutions to be deviated from the spirit and the scope of the technical solutions in the embodiments of the present application, and thus should all be included in the protection scope of the present application.

What is claimed is:

1. A method for testing a point of sale (POS) machine, being implemented by a test terminal, the method comprising:
    obtaining a sample data of a magnetic track;
    outputting a first test level according to the sample data of the magnetic track, and generating a magnetic field that varies over time according to the first test level; and
    obtaining a first operation result generated by a POS machine under test and obtaining a test result of whether the POS machine under test can perform a card swiping operation normally according to the first operation result; the first operation result is an operation result which is generated by the POS machine under test according to an electromagnetic induction effect generated by the magnetic field that varies over time;
    wherein after obtaining a test result indicating that the POS machine under test performs the card swiping operation normally, the method further comprises:
    inputting a test password into the POS machine under test; and
    obtaining a second operation result generated by the POS machine under test after the test password is obtained by the POS machine under test, and obtaining a test result of whether the POS machine under test can respond to the input test password correctly according to the second operation result.

2. The method according to claim 1, wherein said outputting the first test level according to the sample data of the magnetic track, and generating the magnetic field that varies over time according to the first test level, comprises:
performing a binary encoding on the sample data of the magnetic track to obtain a test data in a binary format; and
generating the first test level according to the test data, and outputting, through a first level output port of the test terminal, the first test level to a magnetic induction coil of the POS machine to generate the magnetic field that varies over time around the magnetic induction coil.

3. The method according to claim 1, wherein the test terminal is provided with a plurality of relays, a plurality of second level output ports and a plurality of conductive plates respectively connected to the plurality of relays;
said inputting the test password to the POS machine under test comprises:
obtaining the test password;
generating a second test level according to the test password; and
outputting the second test level to the plurality of relays through the plurality of second level output ports, and controlling the plurality of conductive plates to be energized by the plurality of relays according to the second test level, and triggering, through the plurality of conductive plates, a plurality of password input buttons of the POS machine under test to input the test password when the plurality of conductive plates are energized.

4. The method according to claim 3, wherein, the plurality of second level output ports correspond to the plurality of password input buttons of the POS machine under test in a one-to-one correspondence manner;
said outputting the second test level to the plurality of relays through the plurality of second level output ports, and controlling the plurality of conductive plates to be energized by the plurality of relays according to the second test level, triggering, through the plurality of conductive plates, the plurality of password input buttons of the POS machine under test and inputting the test password through the plurality of password input buttons when the plurality of conductive plates are energized, comprises:
sequentially outputting the second test level to the plurality of relays connected to the plurality of second level output ports through the plurality of second level output ports corresponding to the plurality of password input buttons associated with a plurality of test password characters, according to the plurality of test password characters in the test password;
sequentially controlling, by the plurality of relays, the plurality of conductive plates to be energized according to the second test level; and
sequentially triggering, by the plurality of conductive plates, the plurality of password input buttons corresponding to the plurality of conductive plates of the POS machine under test to input the test password through the plurality of password input buttons, when the plurality of conductive plates are energized.

5. The method according to claim 4, wherein said sequentially outputting the second test level to the plurality of relays connected to the plurality of second level output ports through the plurality of second level output ports corresponding to the plurality of password input buttons associated with a plurality of test password characters, according to the plurality of test password characters in the test password, comprises:
outputting, through a second level output port corresponding to the password input button associated with a current test password character, the second test level to the relay connected to the second level output port;
obtaining a button input result returned by the POS machine under test; outputting, through the second level output port corresponding to the password input button associated with the current test password character, the second test level to the relay connected to the second level output port, if the button input result is that a key input is failed; or
outputting, through a second level output port corresponding to a password input key associated with a next test password character, the second test level to a relay connected to a second level output port corresponding to a next test password character, until all characters of the test password are input, if the button input result is that the key input is successful.

6. The method according to claim 1, further comprising:
obtaining a card swiping direction and generating a third test level according to the card swiping direction;
sending the third test level to the POS machine under test; and
obtaining a third operation result generated by the POS machine under test according to the third test level and the electromagnetic induction effect.

7. A test terminal, comprising a memory, a processor, and a computer program stored in the memory and executable by the processor, wherein the processor is configured to, when executing the computer program, implement steps of a method for testing a point of sale (POS) machine being implemented by a test terminal, comprising:
obtaining a sample data of a magnetic track;
outputting a first test level according to the sample data of the magnetic track, and generating a magnetic field that varies over time according to the first test level; and
obtaining a first operation result generated by a POS machine under test and obtaining a test result of whether the POS machine under test can perform a card swiping operation normally according to the first operation result; the first operation result is an operation result which is generated by the POS machine under test according to an electromagnetic induction effect generated by the magnetic field that varies over time;
wherein the processor is further configured to input a test password into the POS machine under test, and obtain a second operation result generated by the POS machine under test after the test password is obtained by the POS machine under test, and obtain a test result of whether the POS machine under test can respond to the input test password correctly according to the second operation result, after a test result indicating that the POS machine under test performs the card swiping operation normally is obtained.

8. A non-transitory computer readable storage medium, which stores a computer program, that, when executed by a processor, causes the processor to implement steps of the method according to claim 1.

9. The test terminal according to claim 7, wherein the processor is further configured to perform the step of outputting the first test level according to the sample data of the magnetic track, and generating the magnetic field that varies over time according to the first test level by:

performing a binary encoding on the sample data of the magnetic track to obtain a test data in a binary format; and     generating the first test level according to the test data, and outputting, through a first level output port of the test terminal, the first test level to a magnetic induction coil of the POS machine to generate the magnetic field that varies over time around the magnetic induction coil.

10. The test terminal according to claim 7, wherein the test terminal is provided with a plurality of relays, a plurality of second level output ports and a plurality of conductive plates respectively connected to the plurality of relays; the processor is further configured to perform the step of inputting the test password to the POS machine under test by:

obtaining the test password; generating a second test level according to the test password; and     outputting the second test level to the plurality of relays through the plurality of second level output ports, and controlling the plurality of conductive plates to be energized by the plurality of relays according to the second test level, and triggering, through the plurality of conductive plates, a plurality of password input buttons of the POS machine under test to input the test password when the plurality of conductive plates are energized.

11. The test terminal according to claim 10, wherein the plurality of second level output ports correspond to the plurality of password input buttons of the POS machine under test in a one-to-one correspondence manner;

and the processor is further configured to perform the step of outputting the second test level to the plurality of relays through the plurality of second level output ports, and controlling the plurality of conductive plates to be energized by the plurality of relays according to the second test level, triggering, through the plurality of conductive plates, the plurality of password input buttons of the POS machine under test and inputting the test password through the plurality of password input buttons when the plurality of conductive plates are energized by:

sequentially outputting the second test level to the plurality of relays connected to the plurality of second level output ports through the plurality of second level output ports corresponding to the plurality of password input buttons associated with a plurality of test password characters, according to the plurality of test password characters in the test password;

sequentially controlling, by the plurality of relays, the plurality of conductive plates to be energized according to the second test level; and     sequentially triggering, by the plurality of conductive plates, the plurality of password input buttons corresponding to the plurality of conductive plates of the POS machine under test to input the test password through the plurality of password input buttons, when the plurality of conductive plates are energized.

12. The test terminal according to claim 11, wherein the processor is further configured to perform the step of sequentially outputting the second test level to the plurality of relays connected to the plurality of second level output ports through the plurality of second level output ports corresponding to the plurality of password input buttons associated with a plurality of test password characters, according to the plurality of test password characters in the test password, by:

outputting, through a second level output port corresponding to the password input button associated with a current test password character, the second test level to the relay connected to the second level output port;

obtaining a button input result returned by the POS machine under test; outputting, through the second level output port corresponding to the password input button associated with the current test password character, the second test level to the relay connected to the second level output port, if the button input result is that a key input is failed; or     outputting, through a second level output port corresponding to a password input key associated with a next test password character, the second test level to a relay connected to a second level output port corresponding to a next test password character, until all characters of the test password are input, if the button input result is that the key input is successful.

13. The test terminal according to claim 11, wherein the processor is further configured to perform steps of:

obtaining a card swiping direction and generating a third test level according to the card swiping direction;

sending the third test level to the POS machine under test; and     obtaining a third operation result generated by the POS machine under test according to the third test level and the electromagnetic induction effect.

\* \* \* \* \*